Jan. 29, 1952   W. P. SCHMITTER   2,583,751
AIR-COOLED GEAR SET
Filed Oct. 27, 1948

INVENTOR
WALTER P. SCHMITTER
BY Miles Kenninger
ATTORNEY

Patented Jan. 29, 1952

2,583,751

UNITED STATES PATENT OFFICE 2,583,751

AIR-COOLED GEAR SET

Walter P. Schmitter, Milwaukee, Wis., assignor to The Falk Corporation, Milwaukee, Wis., a corporation of Wisconsin Application October 27, 1948, Serial No. 56,758

10 Claims. (Cl. 184—104)

This invention relates to improvements in means for cooling gear sets and particularly to a gear set in which a portion of the housing is specially cooled and cools the lubricant in the set.

It is one object of the present invention to provide a gear set housing so shaped as to be effectively cooled by a current of air flowing thereover and as to be effective in cooling the lubricating oil within the housing.

Another object of the invention is to provide a gear set with a special housing portion having a surface extending into the path of circulation of at least a portion of the lubricating oil within the housing, for effectively abstracting heat from the oil being circulated and for transmitting the heat to a current of air sweeping over portions of the housing.

A further object of the invention is to provide a gear set construction in which a fan mounted on one shaft of the gear set itself, is so related to a portion of the gear housing wall as to provide a flow of high velocity air over such gear housing wall portion for cooling lubricant thrown on and flowing in contact with the inner surface of such wall portion for a material length of time.

Another object of the invention is to provide a gear set structure for air-cooling the lubricant in the set and in which the whole of the special parts are within the external dimensions of a gear set of similar capacity, and without such special construction.

Figure 1:
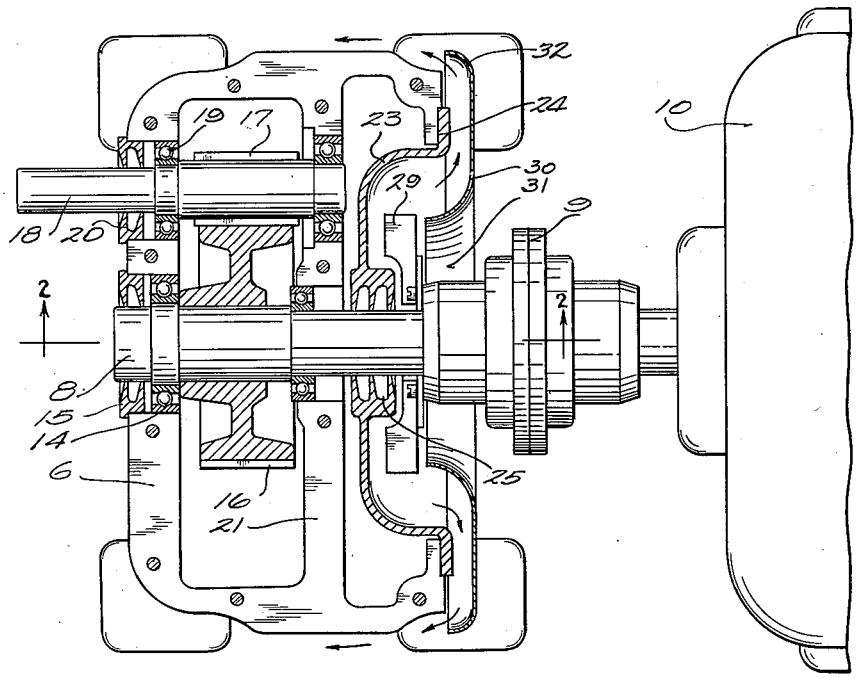
Figure 2:
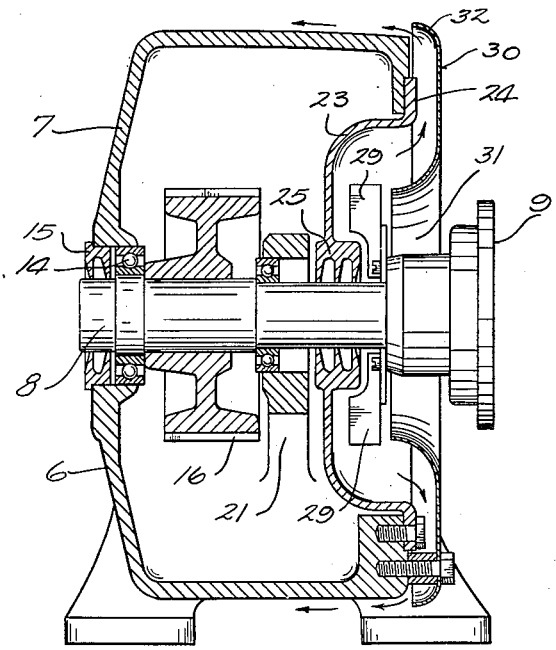

Objects and advantages other than those above set forth will be apparent from the following description when read in connection with the accompanying drawing in which:

Fig. 1 is a sectional view on substantially a central horizontal plane through a gear set embodying the present invention; and Fig. 2 is a vertical sectional view on the plane of line 2—2 of Fig. 1.

In the drawings in which like numerals are applied to like parts, the numerals 6 and 7, respectively, designate the base portion and the cover or top portion of a horizontally split housing in which a shaft 8 is mounted, the shaft being driven through a flexible coupling 9 by a motor 10. The shaft 8 is supported on bearings 14, and a seal 15 is provided about one end of the shaft to prevent the escape of lubricant from the housing as it is circulated within the housing from a pool in the housing base. The oil circulation is due to dipping of gear 16 into an oil pool (not shown) in housing base 6 to splash oil into the bearings and over the gears. The shaft 8 has mounted thereon a gear 16 meshing with a gear 17 on a shaft 18 with one end projecting from the housing. The shaft 18 is mounted in bearings 19 and the projecting shaft end is sealed in the housing by an oil seal 20.

Shafts 8 and 18 are partially supported on an interior member 21 bridging between the side walls of the housing and spaced from both the housing top and above the pool of oil. The bridging member 21 acts as a housing interior baffle tending to cause flow of oil vapor, from the splashing, in a circuit to bring a material portion of the oil vapor into contact with a housing closure 23.

The housing closure 23 is made in one piece as a relatively thin wall but deep dished, bell-shaped or domed member with a peripheral flange 24 and with a central aperture therethrough having an enlarged periphery with multiple flanges to form an oil seal 25. The closure or wall portion 23—25 is set into an aperture in one end of the housing parts 6, 7 and presents an interior convex or domed surface on which oil vapor impinges and on which the vapor droplets coalesce and are cooled during flow over the convex surface into the pool of oil in the housing base. The exterior surface of closure 23 is, of course, concave and provides a recess of material depth about shaft 8.

A fan 29 is mounted on the shaft 8 within the space defined by the closure bell 23 and a shroud 30 is mounted in spaced relation on the housing 6, 7 for further enclosing the fan. The shroud has a central passage 31 about the shaft 8 to direct flow of air into the central portion of the fan and has a peripheral portion 32 co-acting with the closure 23 and with other surfaces of housing portions 6, 7 in defining a passage guiding the air current peripherally discharged from the fan, in its flow over the closure and housing wall surfaces.

Operation of the gears splashes oil into the bearings and over the gears for lubricating all bearings and contacting parts. Such splashing reduces some of the oil to a vapor comprising droplets of various sizes with some lubricant in gaseous form and the vapor tends to circulate in the housing about the bridging member therein. The convex surface of the closure extends into the housing into close proximty with the bridging member for contact with the lubricant vapor and for receiving vapor droplets from portions of the other surfaces of the housing. The closure concave wall surface is cooled by a flow of air produced by the fan whenever, and so long as, the gear set operates.

The current of air discharged peripherally from the fan flows through a relatively constricted passage produced by the co-action of the shroud with the closure and other portions of the housing, and such flow is at a relatively high velocity. The flow passes over the closure member, all of the side walls, the top wall and the bottom wall of the housing thus effectively cooling by far the greater surface area of the entire housing. Heat is, accordingly, abstracted from oil vapor coming into contact with such cooled wall areas and particularly from the oil droplets flowing over the convex surface of the closure. The droplets cooled by contact with the cooled wall surfaces, fall into the pool of oil in the housing and reduce the temperature of the pool to keep the oil at a temperature for proper lubrication of contacting parts.

Although but one embodiment of the present invention has been illustrated and described, it will be apparent that various changes and modifications may be made therein without departing from the invention as defined in the appended claims.

I claim:

1. A gear set comprising a housing having an aperture in one side thereof and retaining a pool of lubricant, a dished closure for the housing aperture, meshing gears in the housing, the closure having the convex surface thereof extending into the housing and co-acting therewith in receiving lubricant splashed in the housing by operation of the gears, and a fan located adjacent the concave surface of the closure for causing flow of a current of air over the concave surface of the closure for cooling lubricant flowing over the convex surface thereof.

2. A gear set comprising a housing having an aperture in one side thereof and retaining a pool of lubricant, a domed closure for the housing aperture, the closure extending into the housing for the flow of lubricant over such closure, a plurality of gears rotatably mounted in the housing for splashing lubricant on the housing and closure wall, a plurality of shafts supporting the gears, one gear shaft extending from the housing, and a fan mounted on the gear shaft and adjacent the exterior surface of the closure for causing flow of air over the exterior surface of the closure and for cooling the lubricant thereon.

3. A gear set comprising a housing having an aperture in one side thereof, a domed wall portion set into and closing the aperture and having the convex surface thereof extending into the housing, a plurality of gears rotatably mounted in the housing for splashing lubricant on the housing wall and closure, a plurality of shafts supporting the gears, one gear shaft extending from the housing through the domed wall portion, and a fan mounted on the shaft within the space defined by the domed wall portion for cooling the same and the lubricant flowing thereover.

4. A gear set comprising a housing having an aperture in one side thereof, a dished closure for the aperture and having a surface extending into the housing, a plurality of gears rotatably mounted in the housing for splashing lubricant on the housing wall and closure, a plurality of shafts supporting the gears, one gear shaft extending from the housing through the closure, a fan mounted on the shaft within the space defined by the closure, and a shroud mounted on the housing for providing an inlet passage to the fan and co-acting with the housing and closure for guiding the air discharged from the fan over the closure and over portions of the housing.

5. In a gear set, a housing base retaining a pool of lubricant, a housing top, the housing base and top co-acting in defining an aperture, a bell-shaped closure for the aperture, a member in the housing base and bridging between opposite sides thereof for co-action with the closure in defining a path for circulation of lubricant vapor in the housing, a plurality of gears rotatably mounted in the housing for splashing lubricant on the housing and closure walls, a plurality of shafts supporting the gears, one gear shaft extending from the housing, a fan mounted on the gear shaft for causing flow of an air current over the closure and the housing exterior surfaces for cooling lubricant vapor flowing over interior closure and housing surfaces into the lubricant pool.

6. In a gear set, a housing having an aperture therein and retaining a pool of lubricant, a plurality of gears rotatably mounted in the housing for splashing lubricant on the housing and closure wall, splashing of the lubricant vaporizing a portion thereof, a plurality of shafts severally supporting the gears, one shaft extending from the housing, a domed closure for the housing aperture, the surfaces of the closure being abruptly curved to change the direction of flow of lubricant vapor and air contacting therewith, and a fan mounted on the end of the extending shaft within the space defined by the closure for discharging on the abruptly curved portion of the closure exterior surface.

7. In a gear set, a housing having an aperture therein and retaining a pool of lubricant, a bridging member extending across the housing and spaced from the top and bottom thereof, a plurality of gears rotatably mounted in the housing for splashing lubricant on the housing and closure wall, splashing of the lubricant vaporizing a portion thereof, a plurality of shafts severally supporting the gears, one shaft extending from the housing, a domed closure for the housing aperture and extending into the housing for co-action with the bridge member in defining a path for lubricant vapor flow for cooling lubricant in the housing, and a fan mounted on the extending end of the shaft adjacent the exterior surface of the closure for causing air flow over the exterior closure surface for cooling lubricant in contact therewith.

8. In a gear set, a housing having an aperture therein and retaining a pool of lubricant, a bridging member extending between opposite sides of the housing and spaced from the top and bottom thereof, a plurality of gears rotatably mounted in the housing for splashing lubricant on the housing and closure wall, splashing of the lubricant vaporizing a portion thereof, a plurality of of shafts severally supporting the gears, one shaft extending from the housing, a dished closure for the housing aperture and extending into the housing for cooling lubricant therein and into proximity with the bridge member for defining a path for lubricant vapor flow in the housing, and a fan mounted on the end of the extending shaft adjacent the exterior surface of the closure for causing air flow over the exterior surface of the closure for cooling lubricant in contact therewith.

9. In a gear set, a housing having an aperture and retaining a pool of lubricant therein, a bridging member extending across the housing and spaced from the top and bottom thereof, a plurality of gears rotatably mounted in the housing for splashing lubricant on the housing and closure wall, splashing of the lubricant vaporizing a portion thereof, a plurality of shafts severally supporting the gears, one shaft extending from the housing, a domed closure for the housing aperture and extending into the housing into proximity with the bridge member for defining a path for lubricant vapor flow therein of less cross-sectional area than the remaining cross-sectional area of the housing, and a fan mounted on the end of the extending shaft adjacent the exterior surface of the closure for causing air flow over the exterior closure surface for cooling lubricant in contact therewith.

10. In a gear set, a housing having an aperture in one side wall and of substantially the area of the wall and retaining a pool of lubricant therein, a plurality of gears rotatably mounted in the housing for splashing lubricant on the housing and closure wall, splashing of the lubricant vaporizing a portion thereof, a plurality of shafts severally supporting the gears, one shaft extending from the housing, a bridging member extending across the housing at right angle with the shaft and spaced from the top and bottom thereof, a domed one-piece closure for the housing aperture extending into the housing for cooling lubricant therein and into proximity and substantially parallel with the bridge member for definining a path for lubricant vapor flow within the housing, a fan mounted on the end of the extending shaft within the space defined by the closure for causing air flow over the closure exterior surfaces for cooling the same, and a shroud on the housing in spaced relation with the closure for coaction therewith for defining air flow passages from the fan.

WALTER P. SCHMITTER.

REFERENCES CITED

The following references are of record in the file of this patent:

UNITED STATES PATENTS

| Number | Name | Date |
| --- | --- | --- |
| 1,564,742 | Acker | Dec. 8, 1925 |
| 2,113,868 | Acker | Apr. 12, 1938 |
| 2,147,391 | Acker | Feb. 14, 1939 |
| 2,391,186 | Noble | Dec. 18, 1945 |